US012368822B2

(12) United States Patent
Gao et al.

(10) Patent No.: US 12,368,822 B2
(45) Date of Patent: Jul. 22, 2025

(54) SCALABLE VISUAL COMPUTING SYSTEM (71) Applicant: PENG CHENG LABORATORY, Shenzhen (CN)

(72) Inventors: Wen Gao, Shenzhen (CN); Yaowei Wang, Shenzhen (CN); Xinbei Bai, Shenzhen (CN); Wen Ji, Shenzhen (CN); Yonghong Tian, Shenzhen (CN)

(73) Assignee: PENG CHENG LABORATORY, Shenzhen (CN)

( * ) Notice: Subject to any disclaimer, the term of this patent is extended or adjusted under 35 U.S.C. 154(b) by 109 days.

(21) Appl. No.: 18/037,408

(22) PCT Filed: Apr. 13, 2021

(86) PCT No.: PCT/CN2021/087017
§ 371 (c)(1),
(2) Date: May 17, 2023

(87) PCT Pub. No.: WO2022/121196
PCT Pub. Date: Jun. 16, 2022

(65) Prior Publication Data
US 2023/0412769 A1 Dec. 21, 2023

(30) Foreign Application Priority Data
Dec. 8, 2020 (CN) .......................... 202011425341.5

(51) Int. Cl.
H04N 7/18 (2006.01)
G06V 20/40 (2022.01)

(52) U.S. Cl.
CPC ............ H04N 7/181 (2013.01); G06V 20/40 (2022.01)

(58) Field of Classification Search
CPC ...... H04N 7/181; H04N 19/149; G06V 20/40; G06V 20/52; H04L 67/025; H04L 63/10;
(Continued)

(56) References Cited

U.S. PATENT DOCUMENTS

2017/0034483 A1* 2/2017 Aghdasi ................... G06F 16/78
2019/0174149 A1* 6/2019 Zhang ................ H04N 21/4728
(Continued)

FOREIGN PATENT DOCUMENTS

CN 105898313 A 8/2016
CN 108512909 A 9/2018
(Continued)

Primary Examiner — Thai Q Tran
Assistant Examiner — Stephen R Smith
(74) Attorney, Agent, or Firm — The Webb Law Firm (57) ABSTRACT A visual computing system is disclosed. The visual computing system may include a front-end device, an edge service and a cloud service which are in communication connection, the front-end device is configured to output compressed video data and feature data, the edge service is configured to store the video data, and converge the feature data, transmit various types of data and control commands, and the cloud service is configured to store algorithm models used to support various applications, and return a model stream according to a model query command, realizing a data transmission architecture with multiple streams of video stream, feature stream, and model stream in parallel, and a system architecture of end, edge, and cloud collaboration.

18 Claims, 2 Drawing Sheets (58) Field of Classification Search
CPC ..... H04L 65/70; H04L 65/75; H04L 67/1001; G06F 16/2462; G06F 16/2465
USPC .......................................... 348/143; 382/103
See application file for complete search history.

(56) References Cited

U.S. PATENT DOCUMENTS

| | | | |
|---|---|---|---|
| 2020/0007823 A1* | 1/2020 | Ophir | H04N 19/17 |
| 2020/0192741 A1 | 6/2020 | Estrada et al. | |
| 2020/0327371 A1* | 10/2020 | Sharma | H04L 67/34 |
| 2021/0096911 A1 | 4/2021 | Zhu et al. | |
| 2021/0195089 A1* | 6/2021 | Kojima | G06F 16/148 |
| 2022/0053171 A1* | 2/2022 | Naphade | G08B 13/19673 |
| 2022/0070453 A1* | 3/2022 | Tang | H04N 19/136 |
| 2023/0262234 A1* | 8/2023 | Amini | H04L 43/0858 |
| | | | 709/219 |

FOREIGN PATENT DOCUMENTS

| | | |
|---|---|---|
| CN | 109451040 A | 3/2019 |
| CN | 111787321 A | 10/2020 |
| CN | 111901573 A | 11/2020 |
| CN | 112162849 A | 1/2021 |
| CN | 113162967 A | 7/2021 |
| WO | 2020209951 A1 | 10/2020 |

\* cited by examiner

SCALABLE VISUAL COMPUTING SYSTEM

CROSS-REFERENCE TO RELATED APPLICATIONS

This application is the United States national phase of International Application No. PCT/CN2021/087017 filed Apr. 13, 2021, and claims priority to Chinese Patent Application No. 202011425341.5 filed Dec. 8, 2020, the disclosures of which are hereby incorporated by reference in their entireties.

TECHNICAL FIELD

The present disclosure relates to the field of application of visual sensors, and more particularly, to a visual computing system.

BACKGROUND

Video surveillance systems offer unique advantages such as intuition, accuracy, and rich information content. With advancements in computer technology, image processing, and transmission technologies, video surveillance systems are becoming increasingly prevalent in security, policing, transportation, production, and other fields. Presently, the number of cameras installed in various locations such as roads, communities, airports/train stations, and large venues is increasing, with higher and higher resolution, resulting in a significant increase in the amount of video or image data generated, which presents significant challenges for data processing and transmission.

A traditional video surveillance system typically employs a labor-division model wherein cameras are used for image or video acquisition and compression, while backend servers are configured for data processing, analysis, and identification. However, this approach presents certain challenges. Firstly, the transmission of a large amount of video data puts significant pressure on the system bandwidth, and due to limited backend processing capacity, a large concentration of video data in the backend for processing can cause video pile-up and inefficient information processing, as a result, a lot of data can be overwritten by new data if it cannot be analyzed in time. Secondly, the cameras are relatively inflexible in terms of configuration, and changing an application service often requires camera reinstallation, resulting in resource waste, and the entire processing process requires significant manual participation and is not highly intelligent.

In essence, the issue with traditional video surveillance systems is that the system architecture is unable to keep up with the development level of individual devices such as cameras, resulting in difficulties in managing the rapid expansion of data. Meeting real-time processing requirements for massive data is only possible through improvements in system architecture and internal data interaction modes, and optimizing system design based on actual application requirements.

Therefore, there is a need to improve and develop the existing technology.

SUMMARY

Considering the limitations of the existing technology, the present disclosure aims to address the technical problem by providing a visual computing system, which will help to overcome the problem that the existing video surveillance system cannot meet the real-time processing requirements for massive data.

In accordance with some non-limiting embodiments, a visual computing system is disclosed. The visual computing system may include a front-end device, an edge service and a cloud service which are in communication connection, the front-end device is configured to output compressed video data and feature data, the edge service is configured to store the video data, and converge the feature data, transmit various types of data and control commands, and the cloud service is configured to store algorithm models used to support various applications, and return a corresponding model stream according to a model query command, realizing a data transmission architecture with multiple streams of video stream, feature stream, and model stream in parallel, and a system architecture of end, edge, and cloud collaboration.

In accordance with some non-limiting embodiments, a front-end device for a visual computing system is disclosed. The front-end device establishes communication connection with an edge service of the visual computing system, and is configured to collect and analyze scene information, the front-end device may include: an image processing module configured to perform pre-processing, compression, coding and transcoding of the image data, output a compressed video stream carrying timestamp information to the device control and data interaction module, and to output the pre-processed image data to the intelligent computing module and receive a control command transmitted by the device control and data interaction module to complete the configuration of processing parameters; an intelligent computing module configured to perform structured analysis, feature extraction and feature coding of the image data, and output a compact feature stream and a structured result stream to the device control and data interaction module, the intelligent computing module is further configured to receive control commands and receive a model stream and dynamically update an algorithm model, the control commands may include a parameter configuration command and a function definition command; a device control and data interaction module configured to package and encapsulate the received temporal information, spatial information, compressed video stream, pictures, compact feature stream and structured result stream, transmit them to the edge service, receive and parse the model stream and control commands issued by the edge service or the cloud service, and transmit the model stream and the control commands to a corresponding processing module, and further to complete the work comprising at least one of process control, device control, status monitoring, model update or transmission control of the front-end device, and acquire operating status and identification information of the device.

In accordance with some non-limiting embodiments, an edge service for a visual computing system is disclosed. The edge service establishes communication connection with a front-end device and a cloud service of the visual computing system, respectively, for convergence, storage and forwarding of video data and feature data at a local scale, and for resource scheduling and collaborative computing, the edge service may include: an integrated control module configured to receive reported data or commands from the front-end device, control their response process, push a compact feature stream and a structured result stream to the cloud service, receive and forward the control commands or model stream issued by the cloud service, manage an access process and status of the front-end device, listen to the status of the front-end device, and schedule a collaborative operation mode between a plurality of front-end devices; a streaming media module configured to receive the compressed video stream, and transcode, capture and package the compressed video stream; a calculation processing module configured to complete the work comprising at least one of scheme generation of a multi-node linkage system, image data processing and analysis, multi-node data collaborative analysis and joint optimization according to the defined functions and tasks; and a data storage module configured to receive the compressed video stream of the streaming media module, and the compact feature stream and the structured result stream reported by the front-end device, store and manage the compressed video stream, the compact feature stream and the structured result stream in categories, receive a video/picture data fetching command issued by the cloud service, retrieve the compressed video stream or pictures according to conditions, and return the compressed video stream or pictures retrieved to the cloud service.

In accordance with some non-limiting embodiments, a cloud service for a visual computing system is disclosed. The cloud service establishes communication connection with an edge service of the visual computing system, for data converging, collaborative computing, analysis, mining and decision-making at a global scale, the cloud service may include: a central control module configured to perform configuration management and resource scheduling on all nodes in the system, manage transmission processes of a data stream and a control stream in a unified manner, issue device control, function definition and model update commands to the front-end device, issue a task to the edge service, and receive and process a data reporting command and a status reporting command of the edge service; a data center module configured to fetch a compressed video stream or pictures from the edge service on demand, to store, retrieve, and fetch a compact feature stream, a structured result stream, and the compressed video stream or pictures obtained on demand; a data analysis module configured to receive the compact feature stream and the structured result stream, or retrieve and fetch data from the data center module according to user commands, converge big data information, analyze and mine the big data information, and extract high-level semantic information and return to a user; a calculation simulation module configured to perform structured analysis and processing, simulation prediction, model training, model joint optimization, and collaborative strategy generation, and output computation results; an algorithm model repository configured for storage, query and issuance processes and life cycle management of the algorithm model; and an user interaction module configured to receive a user-related command and return a processing result.

In accordance with some non-limiting embodiments, a visual computing method is disclosed. The visual computing method may include: outputting, by a front-end device, compressed video data and feature data; storing the video data, converging the feature data to a cloud service, and transmitting various types of data and control commands, by an edge service; and storing algorithm models used to support various applications, and returning a corresponding model stream according to a model query command, by the cloud service, realizing a data transmission architecture with multiple streams of video stream, feature stream, and model stream in parallel, and a system architecture of end, edge, and cloud collaboration.

The present disclosure has the following beneficial effects: compared to the existing technology, the core of the scalable visual computing system provided by the present disclosure lies in a parallel data transmission architecture where three types of data streams are transmitted in parallel: the compressed video stream, the compact feature stream and the model stream. The transmission of the compressed video stream and the compact feature stream occurs in real-time, and the front-end device can report the compressed video stream and the compact feature stream simultaneously according to the configuration, which can not only alleviate the pressure of data transmission, but also allows for effective information aggregation in real-time for joint data analysis. The transmission of the model stream occurs episodically, and when a model needs to be updated, a model stream is directly or indirectly transmitted by the cloud service to the front-end device to realize dynamic model deployment and update, thereby supporting definitions of functions and algorithms of the front-end device to complete various application tasks. The scalable visual computing system provided by the present disclosure also has scalability, and the compressed video stream may be saved in the edge service, the compact feature stream may be converged to the cloud service in real-time, and the cloud service performs analysis, identification, retrieval and other subsequent tasks using the feature information. When the cloud service requires the use of original image data due to business needs, the compressed video stream can only be fetched from the edge service after obtaining authorization from the user. All nodes of the front-end device, the edge service and the cloud service in the scalable visual computing system provided by the present disclosure have globally unified spatial-temporal identifications. That is, all nodes have a unified temporal representation method and synchronized temporal information, have a unified spatial information representation method and reference system, and have globally unique device identifications, the spatial information includes position, velocity and attitude, as well as their respective accuracy information. The scalable visual computing system has an autonomous decision-making mechanism for event response, and can dynamically configure the node operating status, as well as operating parameters, algorithm models, output data stream and other content according to definable characteristics of functions of the front-end device, to automatically complete some tasks that typically require a large amount of human labor in the traditional video surveillance system.

DETAILED DESCRIPTION

The present disclosure provides a visual computing system, which may be a scalable visual computing system. In order to make the objects, technical solutions and effects of the present disclosure clear and explicit, the following will describe the present disclosure in detail in conjunction with accompany drawings and embodiments. It should be understood that the specific embodiments described here are only used to explain the present disclosure, but not used to limit the present disclosure.

It can be understood by those having ordinary skill in the art that the singular forms "a", "an", "the", "said" and "this" may also encompass plural forms, unless otherwise stated. It should be further understood that the expression "include/comprise" used in the description of the present disclosure means there exists a feature, an integer, a step, an operation, an element and/or a component, but does not preclude existing or adding of one or more other features, integers, steps, operations, elements, components and/or groups thereof. It may be understood that when an element is described as being "connected" or "coupled" to another element, the described element may be directly connected or coupled to the other element, or an intermediate element may be arranged between the described element and the other element. Further, the "connected" or "coupled" as used herein may include wireless connection or wireless coupling. The term "and/or" as used herein includes all or any unit and all combinations of one or more associated listed items.

Those having ordinary skill in the art will appreciate that all terms (including technical and scientific terms) as used herein have the same meanings as commonly understood by those of ordinary skill in the art of the present disclosure, unless otherwise defined. It also should be understood that terms such as those defined in the general dictionary should be understood to have the meanings consistent with the meanings in the context of the existing technology, and will not be interpreted in an idealized or overly formal meaning unless specifically defined as herein.

The present disclosure will be further described below in conjunction with the accompanying drawings and the description of the embodiments.

The existing video surveillance system includes an end-edge form or end-cloud form, wherein a camera is configured for video/image acquisition and compression and only outputs one compressed video stream, and the edge/cloud part is configured for analysis processing of large-scale video/image data. However, due to the limitation of system bandwidth, a large amount of original data is difficult to converge, and the centralized analysis of a large amount of data also brings a huge processing pressure to the edge/cloud. Moreover, the edge/cloud can only process a decoded video, which will lead to certain performance loss, and using cameras with single function and purpose can also result in issues such as redundant camera deployments and wastage of resource. With the rapid growth of video data and the gradual improvement of system intelligence requirements, the defects of the system architecture seriously restrict the industrial application of video big data. In addition, the user's privacy cannot be effectively protected because original videos are directly uploaded to a cloud service for computing and storage.

Figure 1:
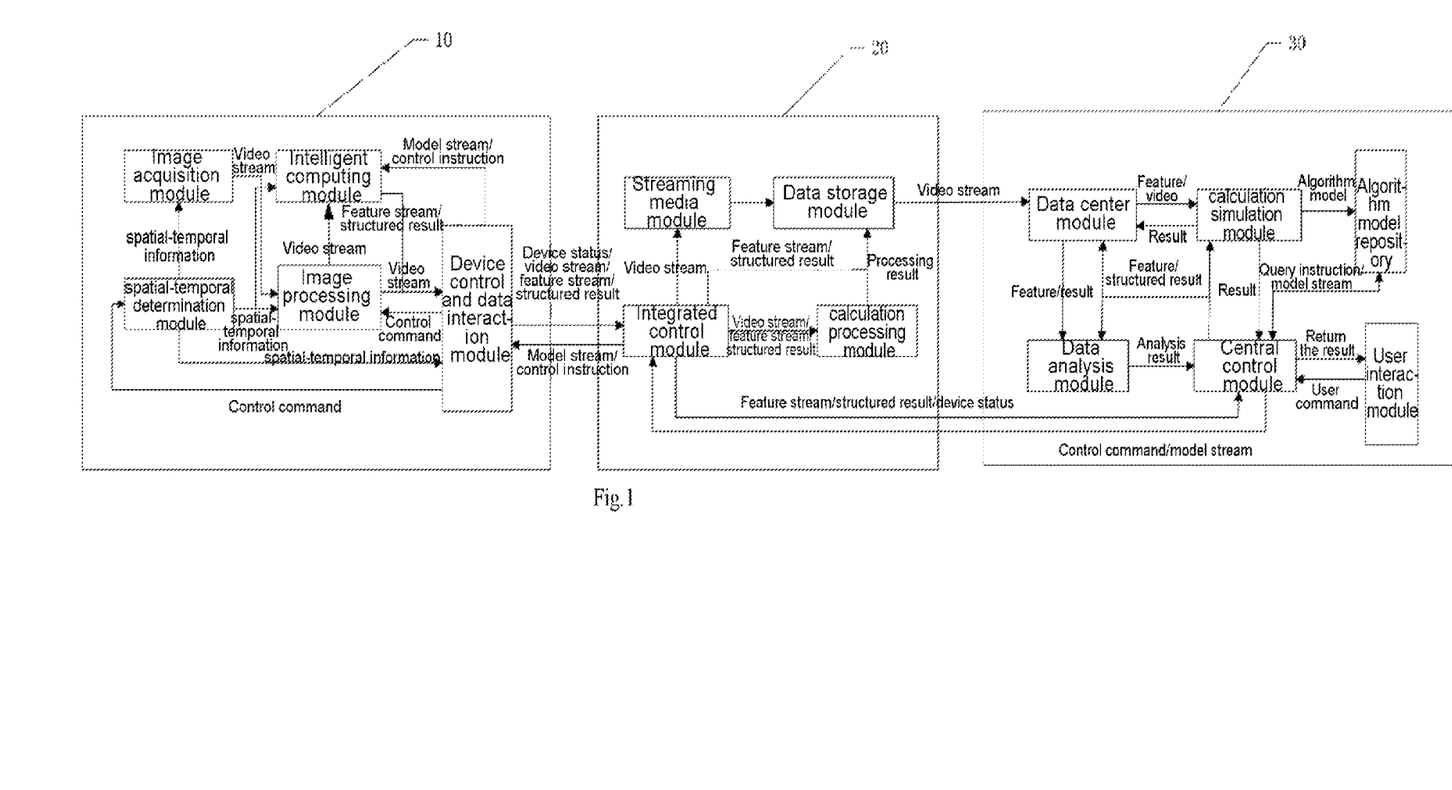
FIG. 1 is a schematic block diagram of a preferred embodiment of a scalable visual computing system according to the present disclosure.

In view of the problems existing in the existing technology, the present disclosure provides a scalable visual computing system. As shown in FIG. 1, the scalable visual computing system includes a front-end device 10, an edge service 20 and a cloud service 30 which are in communication connection in sequence. The front-end device 10 is configured to perceive and collect scene visual information to obtain image data, perform video and image processing, feature coding processing and intelligent analysis processing on the image data, encapsulate processing results as well as identification information of the front-end device, temporal information and spatial information to obtain a compressed video stream, a compact feature stream and a structured result stream, and output the compressed video stream, the compact feature stream and the structured result stream accordingly according to the configuration. The front-end device 10 is further configured to report its own status information to the edge service according to a fixed period, and to receive control commands and a model stream issued by the edge service, to complete the configuration of its own operating parameters and model update, the control commands including a device control command and a function definition command. The edge service 20 is configured to receive and store the compressed video stream, the compact feature stream and the structured result stream transmitted by the front-end device, output the compact feature stream and the structured result stream in real-time, converge the compact feature stream and the structured result stream to the cloud service, and output the compressed video stream to the cloud service on demand according to a data fetching command of the cloud service. The edge service 20 is further configured to receive and process a node access management command reported by the front-end device and update a device management list. The edge service 20 is further configured to report status information of the front-end device and the edge service to the cloud service, receive a model query command of the front-end device and forward the model query command to the cloud service, receive the model stream and the control commands issued by the cloud service, and issue the model stream and the control commands to the front-end device, the control commands including the device control command and the function definition command. The edge service 20 is further configured to complete multi-node linkage scheme generation, data configuration scheme planning, collaborative operating scheduling, image data processing and analysis, data collaborative analysis and joint optimization according to defined functions and tasks. The cloud service 30 is configured to receive, store and converge the compact feature stream and the structured result stream outputted by the edge service in real-time, and fetch the compressed video stream from the edge service on demand. The cloud service 30 is further configured to store algorithm models used to support various applications, manage a life cycle and an update process of algorithms and models, receive a model query command sent by the edge service or front-end device, return a model query result or a model stream accordingly, transmit the control command according to a triggering condition, receive and respond to a third-party user interaction command. The cloud service 30 is further configured to perform big data analysis and mining, simulation computation, and a multi-edge collaborative task. The cloud service 30 is further configured to receive device status information reported by the edge service, and perform configuration management, function definition, and resource collaborative scheduling of all nodes.

Specifically, the problem of the traditional video surveillance system is caused in that the system architecture cannot keep up with the development level of a single-machine device such as a camera with the rapid expansion of data; and the real-time processing requirements for massive data can be achieved only by improving the system architecture and the internal data interaction mode, and optimizing the system design according to actual application requirements. Therefore, this embodiment proposes a scalable visual computing system by virtue of a biological principle that the information transmitted by the human eyes to the brain is extracted and reduced. The scalable visual computing system includes three subsystems: a front-end device, an edge service, and a cloud service (end, edge, and cloud). The core of the scalable visual computing system lies in a data transmission architecture where three types of data streams: the compressed video stream, the compact feature stream and the model stream are generated and transmitted in parallel. The transmission of the compressed video stream and the compact feature stream is in real-time, and the front-end device can report the compressed video stream and the compact feature stream at the same time according to the configuration, which can not only alleviate a pressure of data transmission, but also converge effective information in real-time for joint data analysis. The transmission of the model stream is episodic, and when a model needs to be updated, a model stream is directly or indirectly transmitted by the cloud service to the front-end device to realize dynamic model deployment and update, thereby supporting definitions of functions and algorithms of the front-end device to complete different application tasks. The scalable visual computing system provided by the present disclosure also has the scalability. The compressed video stream may be saved in the edge service, the compact feature stream may be converged to the cloud service in real-time, and the cloud service performs analysis, identification, retrieval and other subsequent tasks using the feature information. When the cloud service must use original image data due to business needs, the compressed video stream can be fetched from the edge service only after a user's authorization is obtained. Therefore, this embodiment redefines a computing architecture, a transmission architecture and functional characteristics of each sub-system of the video surveillance system, and achieves an effect of full utilization of resources through the optimal division of labor and organic collaboration among the sub-systems, thereby realizing the real-time processing and effective utilization of massive video data.

In this embodiment, the specific functions of the front-end device can be flexibly defined by software, and the algorithm model can be dynamically updated, thus achieving the purpose of one device with multiple uses. The front-end device also contains globally unified spatial-temporal identification information, which is convenient for multi-machine collaborative tasks. To sum up, the scalable visual computing system has a multi-stream parallel data transmission architecture of the compressed video stream, the compact feature stream and the model stream. Through the timely extraction of visual high-value information on the front-end device, distributed storage and mesoscopic data analysis of original visual data in the edge service, and macro big data analysis and mining in the cloud service, the pressure of data transmission in the system is reduced, the centralized computing pressure of the cloud service is relieved, and the challenges of aggregating, storing, and processing large amounts of video data are addressed. The model training problem in the case of data privacy protection can be solved by means of supporting federated learning by edge-cloud (the edge service and the cloud service) collaboration. The edge service and the cloud service also have an automatic decision-making mechanism for event response, which can automatically configure front-end functions, models and output content according to the tasks performed, complete scheduling and control over the front-end and edge during task execution, and reduce the dependence of various applications on human labor.

All nodes of the front-end device, the edge service and the cloud service in the scalable visual computing system provided by the present disclosure have globally unified spatial-temporal identifications. That is, all nodes have a unified temporal representation method and synchronized temporal information, have a unified spatial information representation method and reference system, and have globally unique device identifications, the spatial information including a position, a velocity and an attitude, and their accuracy information. The scalable visual computing system has an autonomous decision-making mechanism for event response, and can dynamically configure a node operating status and operating parameters, algorithm models, an output data stream, etc., based on the definable characteristics of functions of the front-end device, to automatically complete some tasks that rely on a large amount of human labor in the traditional video surveillance system.

As an example, the front-end device in this embodiment may be a digital retina front-end. The so-called digital retina front-end, which is analogous to the human retina, evolves and innovates the traditional camera and even a visual computing architecture, so as to more intelligently support the urban brain, and serve for intelligent security, urban fine management and other intelligent applications. More specifically, traditional cameras simply compress captured video data and upload it to the cloud for storage, followed by analysis and identification, but the digital retina front-end in this embodiment can complete efficient video coding and compact feature expression, and output compressed video data and feature data in real-time. The video data is stored in the edge service, the feature data is finally converged to the cloud service in real-time, and the cloud service can fetch the original data according to business needs and authorization mechanisms.

In some implementations, the front-end device determines its own spatial-temporal information in real-time, perceives and collects scene visual information, and acquires image data, the image data including videos and pictures. Then, the image data is subjected to image processing and intelligent analysis processing, including: video/picture pre-processing, video compression coding and transcoding, feature extraction and feature coding, structural analysis, etc. Finally, the processing results are encapsulated together with temporal information, spatial information, and device identification information to generate a compressed video stream, a compact feature stream, and a structured result stream, which can be optionally output according to the configuration, and device status information is reported according to a fixed period. The front-end device receives a device control command issued by the edge service to complete the front-end on-off control and adjustment of operating parameters; receives a function definition command issued by the edge service to complete the configuration of front-end functions, output data, etc.; and receives a model update command issued by the edge service to complete the loading, as well as full or incremental update of the algorithm model.

In this embodiment, the video/picture pre-processing includes operations such as noise reduction, dehazing, white balance adjustment, of an original video/picture to improve the video/picture quality. The video compression, coding and transcoding operations are to eliminate redundant information in the original video data using coding and decoding algorithms based on the orthogonal transformation principle and the background modeling technology, etc., and a more efficient video stream can be generated according to a configured coding format.

As shown in FIG. 1, the front-end device 10 includes a spatial-temporal determination module, an image acquisition module, an image processing module, an intelligent computing module, and a device control and data interaction module.

In this embodiment, the spatial-temporal determination module is configured to acquire unified temporal information for realizing and maintaining time synchronization among nodes in the system. The spatial-temporal determination module is configured to acquire spatial-temporal information of the front-end device, and provide the spatial-temporal information to other modules of the front-end device in real-time for computation and transmission, the spatial-temporal information including position, velocity, attitude and other information. The spatial-temporal determination module is further configured to receive the control command sent by the device control and data interaction module to complete the configuration of its own operating parameters.

In this embodiment, the image acquisition module is configured to acquire and convert image data, and transmit the image data to the image processing module.

In this embodiment, the image processing module is configured to perform pre-processing, compression, coding and transcoding of the image data, output a compressed video stream carrying timestamp information to the device control and data interaction module, and output the pre-processed image data to the intelligent computing module. The image processing module is further configured to receive a control command sent by the device control and data interaction module to complete the configuration of processing parameters. In this embodiment, the image data includes video data and picture data. The image data pre-processing includes operations such as noise reduction, dehazing, and white balance adjustment of image data to improve the video/picture quality. The steps of compressing, coding and transcoding the image data include: eliminating redundant information in the original video data using coding and decoding algorithms based on an orthogonal transformation principle and a background modeling technology, etc., and a more efficient video stream can be generated according to a configured coding format.

In this embodiment, the intelligent computing module is configured to perform structured analysis, feature extraction and feature coding of the image data, and output the compact feature stream and the structured result stream to the device control and data interaction module. The intelligent computing module is further configured to receive control commands, the control commands including a parameter configuration command and a function definition command, receive a model stream and dynamically update an algorithm model. In this embodiment, performing feature extraction on the image data includes: performing a feature extraction operation on the image data or objects or areas of interest, including traditional manual features and deep learning features, which are used to converge to the edge service or the cloud service for feature retrieval and data collaborative analysis. Performing feature coding on the image data includes: coding and compressing the traditional manual features and a large number of deep learning features extracted from the image data to obtain a compact feature stream, and feature coding standards include, but are not limited to, CDVS and CDVA. Performing structured analysis on the image data includes: performing detection, tracking, identification, segmentation, statistics and other processing on objects or events of interest in the image data to obtain target structured information, such as face recognition information, driver's driving behavior analysis, traffic flow statistics, vehicle/pedestrian counting, license plate recognition information, road structured information, scene information, etc.; and then encapsulating the target structured information into a structured result stream in a certain format.

Figure 2:
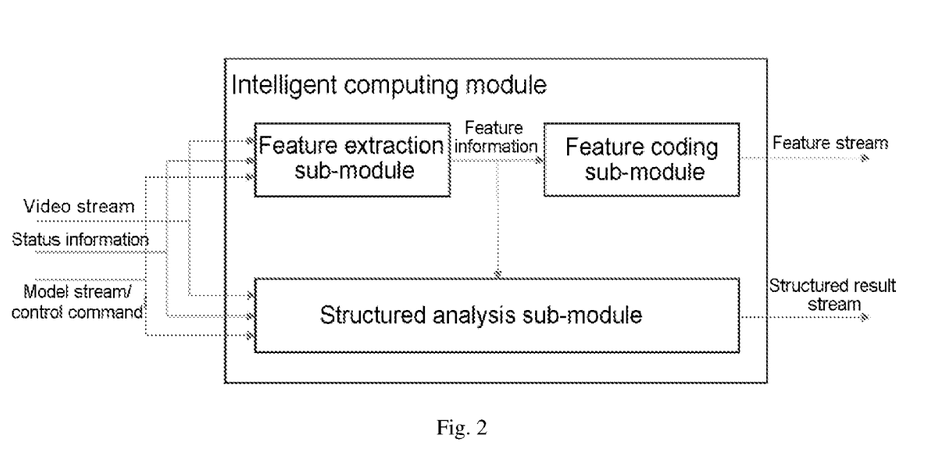
FIG. 2 is a schematic block diagram of an intelligent computing module according to the present disclosure.

As shown in FIG. 2, the intelligent computing module includes a feature extraction sub-module, a feature coding sub-module, and a structured analysis sub-module. The feature extraction sub-module is configured to perform feature extraction on the image data, and transmit the extracted feature information to the feature coding sub-module. The feature coding sub-module is configured to code the feature information and output a compact feature stream. The structured analysis sub-module is configured to analyze and process the image data in combination with the status information of the front-end device, and output a structured result stream.

In this embodiment, the device control and data interaction module is configured to complete process control, device control, status monitoring, model update and transmission control of a digital retina front-end data processing, acquire operating status and identification information of the device, receive the spatial-temporal information, the compressed video stream/picture, the compact feature stream and the structured result stream, package, encapsulate and transmit them to the edge service, receive and parse the model stream and control command issued by the edge service or cloud service, and transmit the command to the processing module of the front-end device.

In some implementations, the edge service receiving and processing the node access management command reported by the front-end includes: receiving and processing device registration, login, logout and other commands sent by the front-end device, updating a device management list, and reporting front-end device access information to the cloud service; receiving and monitoring the device status information reported by the front-end device, and reporting the status information of the front-end device to the cloud service if the operating status of the device changes or an abnormal situation occurs, such as the device is in an abnormal operating status, or spatial information such as a front-end position and an attitude changes; and receiving a model query command reported by the front-end device and forwarding this command to the cloud service.

In some implementations, the edge service receives and converges data streams reported by the front-end for processing and storage, and forwards part of the data to the cloud service. Specifically, this step includes: receiving the compressed video stream and picture data, the compact feature stream, and the structured result stream reported by the front-end device, capturing, packaging, and transcoding the compressed video stream, then saving a video file, and updating a video file database; parsing and repackaging the picture data, saving the data as a picture file in a specified format, and updating a picture file database; parsing and unpacking the compact feature stream, saving a feature file, and updating the structured feature library and the feature file database; parsing the structured result stream and storing it in a structured result database; and forwarding the compact feature stream and the structured result stream directly to the cloud service.

In some implementations, the edge service receives a device control command and a function definition command issued by the cloud service and forwards them to the front-end device; receives a video/picture data fetching command issued by the cloud service, retrieves a required video/picture in the database according to query conditions, and returns the video/image data to the cloud service; and receives a model update command issued by the cloud service and forwards this command to the front-end device.

In some implementations, the edge service completes the operating of multi-node linkage scheme generation, data configuration scheme planning, collaborative operating scheduling, video/image processing and analysis, data collaborative analysis and joint optimization according to defined functions and tasks. Specifically, the edge service autonomously determines the number of front-end nodes, detailed node information and data requirements required to complete a task according to functions and tasks of an actual application system in conjunction with predefined algorithms, configures relevant front-end nodes, schedules a plurality of front-ends to operate cooperatively, and performs joint analysis and optimization using the converged feature data or structured results of several front-end devices to complete some specific tasks of concern in the construction of smart cities, for example, computes an optimal allocation mode of signal light switching in real-time by monitoring traffic parameters of interconnected roads within a certain area and dynamically adjusts a traffic light control scheme; and tracks and arrests hit-and-run vehicles/offenders, etc. Video/image processing and analysis refers to analyzing and processing a video/picture again using a visual information processing technology to extract useful information for use in post-processing or new tasks.

In some implementations, as shown in FIG. 1, the edge service includes an integrated control module, a streaming media module, a data storage module, and a calculation processing module.

In this embodiment, the integrated control module is configured to receive reported data or commands from the front-end device, control their response process, push the compact feature stream and the structured result stream to the cloud service in real-time, receive and forward the control command or model stream issued by the cloud service, manage an access process and status of the front-end device, listen to the status of the front-end device, and schedule a collaborative operation mode between a plurality of front-end devices.

In this embodiment, the streaming media module is configured to receive the compressed video stream, and transcode, capture and package the compressed video stream.

In this embodiment, the data storage module is configured to receive the compressed video stream of the streaming media module, and the compact feature stream and the structured result stream reported by the front-end device, store and manage the compressed video stream, the compact feature stream and the structured result stream in categories, receive video/picture data fetching command issued by the cloud service, retrieve the compressed video stream or pictures according to conditions, and return the compressed video stream or pictures retrieved to the cloud service.

In this embodiment, the calculation processing module is configured to complete the operating of scheme generation of a multi-node linkage system, image data processing and analysis, multi-node data collaborative analysis and joint optimization according to the defined functions and tasks.

Figure 3:
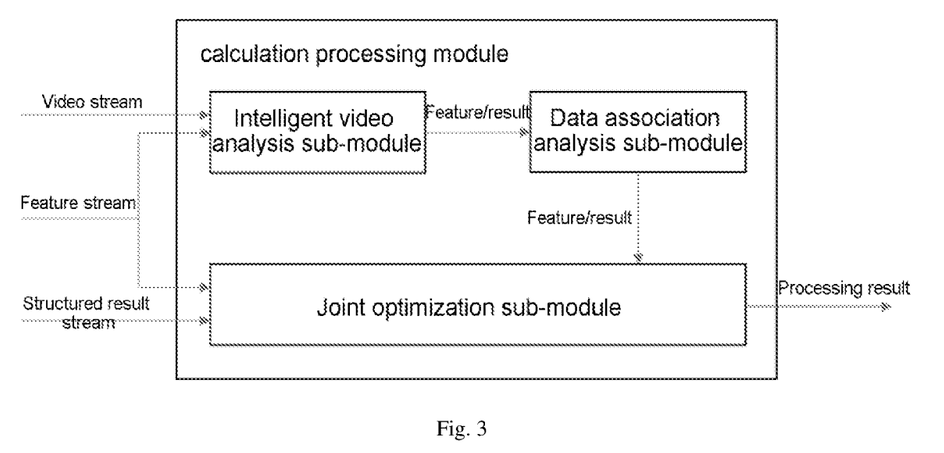
FIG. 3 is a schematic block diagram of a calculation processing module according to the present disclosure.

As shown in FIG. 3, the calculation processing module includes an intelligent video analysis sub-module, a data association analysis sub-module, and a joint optimization sub-module. The intelligent video analysis sub-module, the data association analysis sub-module and the joint optimization sub-module jointly perform data co-processing, joint analysis and optimization on the compressed video streams, compact feature streams and structured result streams output by a plurality of front-end devices, to complete some specific tasks of concern in the construction of smart cities, for example, computing an optimal allocation mode of signal light switching in real-time by monitoring traffic parameters of interconnected roads within a certain area and dynamically adjusts a traffic light control scheme; and tracking and arresting hit-and-run vehicles/offenders, etc. The calculation processing module is further configured to perform video/image processing and analysis, and adopts a visual information processing technology to analyze and process a video/picture again to extract useful information for use in post-processing or new tasks.

In some implementations, the data storage module includes an access management sub-module, a data retrieval sub-module, and a database sub-module. The access management sub-module is configured to support data entry, saving and fetching operations. The data retrieval sub-module is configured to perform data query and retrieval operations. The database sub-module is configured to store structured data or unstructured data.

In some specific implementations, the database sub-module includes a video file library, a picture file library, a feature file library, a structured feature library, and a structured result library. The video file library is configured to store video stream data and summary information thereof. The picture file library is configured to store picture file data and summary information thereof. The feature file library is configured to store unstructured feature stream data and summary information thereof. The structured feature library is configured to store structured feature data; and the structured result library is configured to store structured result data.

In some implementations, the cloud service performs configuration management and function definition for all nodes, and receives and responds to a third-party user interaction command; converges visual big data information, fetches video/picture data from the edge service on demand, and stores various structured/unstructured data; stores algorithm models used to support various applications, manages a life cycle and an update process of each algorithm, and responds to a model query command from the front-end; and performs big data analysis and mining, and simulation computation, and performs more macroscopic multi-edge collaborative tasks.

The cloud service receives the front-end device status information reported by the edge service, monitors and maintains a device operating status and spatial-temporal information, and updates a device management list; listens to an access request, a connection status, and device status information of an edge node, and manages a device identification, an authority, a status, and a connection relationship of the edge node; and automatically generates types, quantity, identification numbers, operating parameters and a scheduling strategy of nodes to be scheduled according to the usage of an application system or received user commands, issues a device parameter configuration command, a function definition command, and an algorithm model update command, to configure relevant front-end and edge nodes.

In some implementations, the cloud service receives and converges the compact feature stream and the structured result stream reported by the edge service in real-time, after parsing the compact feature stream, the unstructured features with a large amount of data are saved as a feature file, and the corresponding data summary and keyword information are extracted and stored in the unstructured feature database, and the structured feature information with a small amount of data is stored in the structured feature database; and after parsing the structured result stream, the parsed structured result stream is saved in a corresponding structured result database. In a case where the front-end device and the cloud service are directly connected, the cloud service receives the compressed video stream/picture reported by the front-end device in real-time, stores the video data/picture as a video/picture file, and stores the video/picture summary information in a video/picture database. After user authorization, the cloud service fetches the video data/picture from the edge service on demand, and after processing and intelligent computing, completes tasks such as investigation and evidence collection, video playback, accident confirmation, and secondary identification. The algorithm model repository of the cloud service stores algorithm model files that can support different software and hardware platforms, different applications, and different performances, manages a life cycle of algorithms through an algorithm model database and its update mechanism, receives and responds to algorithm model query and pull commands of the front end, retrieves the required model and checks the adaptability of software and hardware, and also actively issues update commands and model stream data for the latest version of algorithm model.

In some implementations, the cloud service receives user interaction commands, and performs data analysis and mining, simulation prediction, joint optimization, etc., by using video and feature big data information, to complete multi-edge collaborative tasks at large spatial-temporal scales, such as: traffic efficiency analysis and signal light control optimization, bus route and scheduling optimization, moving target recognition and tracking, etc.; and completes large-scale model training using large-scale datasets and powerful computing power, and completes federated learning model training in collaboration with the edge service, while supporting privacy protection applications.

In some implementations, as shown in FIG. 1, the cloud service 30 includes a central control module, a calculation simulation module, a data analysis module, a data center module, an algorithm model repository and a user interaction module.

In this embodiment, the central control module is configured to perform configuration management and resource scheduling on all nodes in the system, performs unified management on transmission processes of data streams, control streams, issues device control, function definition, and model update commands to the front-end device, issues a task to the edge service, and receives and processes a data reporting command and a status reporting command of the edge service, to achieve the secure connection and collaborative scheduling of the device in the system.

In this embodiment, the calculation simulation module is configured to perform structured analysis and processing, simulation prediction, model training, model joint optimization, and collaborative strategy generation, and output computation results.

In this embodiment, the data analysis module is configured to receive the compact feature stream and the structured result stream, or retrieve and fetch data from the data center module according to user commands, converge big data information for analysis and mining, extract high-level semantic information and return the information to the user.

Figure 4:
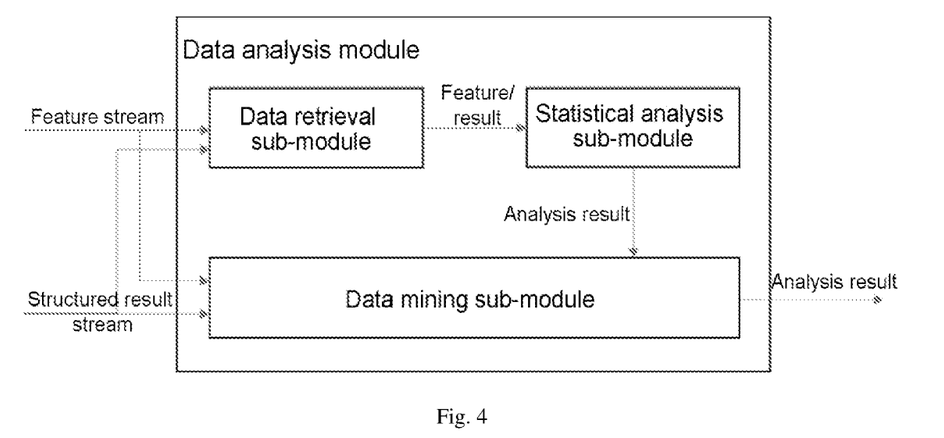
FIG. 4 is a schematic block diagram of a data analysis module according to the present disclosure.

As shown in FIG. 4, the data analysis module includes a data retrieval sub-module, a statistical analysis sub-module, and a data mining sub-module. The data retrieval sub-module is configured to receive or initiate data retrieval and fetching commands to the data center module to acquire data required for an analysis task. The statistical analysis sub-module is configured to perform multi-dimensional analysis on converged feature and result data using classification, regression, correlation analysis and other methods. The data mining sub-module is configured to automatically extract hidden useful information and knowledge from a large amount of historical data or real-time data using methods such as artificial intelligence, machine learning, and statistics.

In this embodiment, the data center module is configured to fetch the compressed video stream from the edge service on demand, to store, retrieve, and fetch the compact feature stream, the structured result stream, and the compressed video stream obtained on demand.

In this embodiment, the algorithm model repository is configured for the storage, query and issuance processes and life cycle management of the algorithm model.

In this embodiment, the user interaction module is configured to receive a user-related command and return a processing result.

In some specific implementations, the data stream includes multimedia data, feature data, result information, spatial-temporal information, environment data, device data, and an algorithm model, the control stream refers to command data related to the operation of the system.

In some implementations, the central control module includes a configuration management sub-module, a collaborative scheduling sub-module, and a command processing sub-module.

In this embodiment, the configuration management sub-module is configured to perform security authentication, configuration management, and status monitoring on all nodes of the front-end device, the edge service, and the cloud service.

In this embodiment, the collaborative scheduling sub-module is configured to issue the device control command, the function definition command, and the operating parameter command to the front-end device according to a scheduling strategy.

In this embodiment, the command processing sub-module is configured for receiving, parsing, and processing a reporting command and a query command of the edge service, issuing model stream data, and responding to the user interaction module.

Taking an object tracking application in a video monitoring scenario as an example, an operating process of the scalable visual computing system of the present disclosure is further explained.

The scalable visual computing system includes a large number of digital retina front-ends deployed in public places such as transportation hubs, important checkpoints and community streets, a plurality of edge services scattered in different locations, and cloud services configured for overall monitoring and commanding.

Data of an object to be tracked is entered through a user interaction interface of the cloud service, the data including multimedia data, spatial-temporal identification data, electronic data, trace data, social data, environment data, device data, etc. For example, a picture containing a face, as well as time, place, environment, status and other information of the face picture; associated persons, associated vehicles, associated devices, etc., related to the person; and behavior information, trajectory information, status change information, etc., related to the face picture. Objects may include criminals, problematic vehicles, abnormal events, and the like.

In a case where the digital retina front-end operates in a normal monitoring mode, a picture shot by the digital retina front-end may contain a dense crowed and small objects, so it is necessary to search for an object from a large amount of data. Taking face detection to track a specific person as an example, fast face detection algorithm, key point detection algorithm, and face feature extraction algorithm are deployed at the front-end. Face detection algorithm models include, but are not limited to, YoloV4, SSD, etc. Key point detection models include, but are not limited to, Resnet18, MobileNetV2, etc. Feature extraction algorithms include, but are not limited to, sphereface and arcface.

The digital retina front-end first uses the face detection model to detect the position and size of a face, then cuts the face area from an original picture, extracts the key point information using the key point detection model, performs regression to obtain 68 key points, and further selects 5 key points of the five senses. The digital retina front-end filters the detected face area, filtering conditions include: according to the occlusion of the face, when an occlusion ratio is greater than a certain threshold, filtering the face picture out; according to the quality of the face picture, when the ambiguity is greater than a certain threshold, filtering the face picture out; and computing a face posture and a pupil distance according to key points, and when the posture is greater than a certain threshold or the pupil distance is less than a certain threshold, filtering the face picture out.

The digital retina front-end performs face calibration on the screened face picture according to the five key points using affine transformation or similarity transformation.

The digital retina front-end extracts facial feature information from the calibrated face image to obtain a feature vector (for example, 1024 dimensions), reports the feature stream, as well as the temporal, spatial and device identification information of the front-end node to the edge service, and finally converges them to the cloud service, and reports and saves the compressed video stream to the edge service.

The cloud service performs feature extraction on the face picture to be tracked by using a feature extraction model consistent with the front-end, compares the extracted features with reported features, roughly identifies the specific person by using the cosine distance as similarity measure, and records front-end information and face structured information to which the specific person belongs.

The cloud service automatically generates a target tracking control command, which is forwarded by the edge service to the front-end node where the specific person is found, and tracks the suspicious face, a tracking algorithm including, but not limited to, KCF and deepsort. The cloud service automatically generates a front-end parameter control command, which is forwarded by the edge service to the front-end node where the specific person is found; adjusts an angle, a focal length and other parameters of the corresponding front-end; enlarges the shot screen to obtain a clearer image of the specific person; selects a face picture with high resolution and good angle according to a face tracking result, and reports the temporal, spatial, and device identification information of the front-end node to the edge service; then converges the picture and the information to the cloud service in real-time for secondary identification; and at the same time reports and saves the compressed video stream to the edge service in real-time.

The cloud service uses a more complex and accurate network model (e.g., Resnet50) for converged specific person pictures to extract and recognize face features, further confirms the specific person, records a spatial-temporal identification of a front-end to which the specific person belongs, and sends an alarm signal.

The cloud service displays a confirmation result of criminals in the previous step, and fetches and displays the original video data captured by the front-end that the specific person was found in real-time from the edge service, and with the assistance of manual confirmation, the criminals are finally identified and locked down.

The relevant departments take next actions based on the obtained information on the time and location where the criminal is located.

In the above process, at different stages of searching, tracking and confirming criminals, under the scheduling of cloud services, the end, edge and cloud automatically select appropriate algorithms for computation, and effectively connect different types of output data through software configuration and algorithm processing, which not only makes reasonable use of resources, but also reflects the flexibility of the end, edge and cloud collaborative computing architecture based on digital retina.

In summary, the core of the scalable visual computing system proposed by the present disclosure lies in a data transmission architecture where three types of data streams: the compressed video stream, the compact feature stream and the model stream are generated and transmitted in parallel. The transmission of the compressed video stream and the compact feature stream is in real-time, and the front-end device can report the compressed video stream and the compact feature stream at the same time according to the configuration, which can not only alleviate the pressure of data transmission, but also converge effective information in real-time for joint data analysis. The transmission of the model stream is episodic, and when a model needs to be updated, a model stream is directly or indirectly transmitted by the cloud service to the front-end device to realize dynamic model deployment and update, thereby supporting definitions of functions and algorithms of the front-end device to complete different application tasks. All nodes in the scalable visual computing system provided by the present disclosure have globally unified spatial-temporal information and device identifications, which not only facilitates joint analysis and target optimization of vision data of different nodes, but also facilitates data fusion processing with other sensing systems. The end, edge, and cloud in the scalable visual computing system have a collaborative mechanism, the functions of the digital retina front-end can be software-defined, the algorithm model can be dynamically updated, the edge/cloud has a task/event response autonomous decision-making mechanism and a joint scheduling function, all of which implements a user-specified task through real-time adjustment of data and control command interaction.

It should be eventually noted that the above embodiments are merely used to illustrate the technical solutions of the present disclosure, and are not intended to limit the present disclosure. Although the present disclosure is described in detail with reference to the above embodiments, those having ordinary skill in the art should understand the technical solutions described in the foregoing embodiments may be modified, or some of the technical features may be equivalently replaced. However, these modifications and replacements do not make the corresponding technical solutions depart from the scope of the technical solutions in the embodiments of the present disclosure.

What is claimed is:

1. A visual computing system, comprising a front-end device, an edge service, and a cloud service, which are in communication connection, wherein, the front-end device is configured to output compressed video data and feature data, the edge service is configured to store the video data, and converge the feature data, transmit various types of data and control commands, and the cloud service is configured to store algorithm models used to support various applications, and issue a model stream, realizing a data transmission architecture with multiple streams of video stream, feature stream, and model stream in parallel, and a system architecture of end, edge, and cloud collaboration.

2. The visual computing system of claim 1, wherein the front-end device, the edge service, and the cloud service are in communication connection in sequence, the front-end device is configured to output compressed video data and feature data to the edge service, the edge service is configured to store the video data and converge the feature data to the cloud service in real-time, the cloud service is configured to generate and store the algorithm models used to support the various applications, and issue the algorithm models to the front-end device or the edge service.

3. The visual computing system of claim 1, wherein the front-end device is configured to:
perceive and collect scene visual information to obtain image data, perform video and image processing, feature coding processing and intelligent analysis processing on the image data, encapsulate processing results as well as identification information of the front-end device, temporal information and spatial information to obtain a compressed video stream, a compact feature stream, and a structured result stream, and output one or more of the compressed video stream, the compact feature stream, or the structured result stream; and
report its own status information to the edge service, and receive control commands and a model stream issued by the edge service, to complete the configuration of its own operating parameters and model update, wherein the control commands comprise a device control command and a function definition command.

4. The visual computing system of claim 1, wherein the edge service is configured to:
receive and store the compressed video stream, the compact feature stream, and the structured result stream transmitted by the front-end device, output the compact feature stream and the structured result stream, converge the compact feature stream and the structured result stream to the cloud service, and output the compressed video stream to the cloud service on demand according to a data fetching command of the cloud service;
report status information of the front-end device and the edge service to the cloud service, send a model query command to the cloud service, receive the model stream and the control commands issued by the cloud service, and issue the model stream and the control commands to the front-end device, wherein the control commands comprise the device control command and the function definition command; and
complete the work comprising at least one of multi-node linkage scheme generation, data configuration scheme planning, collaborative operating scheduling, image data processing and analysis, or data collaborative analysis and joint optimization according to defined functions and tasks.

5. The visual computing system of claim 1, the cloud service is configured to:
receive, store and converge the feature stream and the structured result stream outputted by the edge service, and fetch the compressed video stream from the edge service on demand;
store algorithm models used to support various applications, manage a life cycle, and an update process of algorithms and models, receive a model query command sent by the edge service or the front-end device, return a model query result or a model stream accordingly, transmit the control command, receive and respond to a third-party user interaction command;
perform the work comprising at least one of big data analysis and mining, simulation computation, or a multi-edge collaborative task; and
receive device status information reported by the edge service, and perform configuration management, function definition, and resource collaborative scheduling of all nodes.

6. A front-end device for a visual computing system, wherein the front-end device establishes communication connection with an edge service or a cloud service of the visual computing system, and is configured to collect and analyze scene information, the front-end device comprises:
an image processing module configured to perform coding, and processing of the image data;
an intelligent computing module configured for operation of algorithm and to perform structured analysis, feature extraction and output the feature data and algorithm result data;
a device control and data interaction module configured to acquire and calibrate temporal information, spatial information, and receive and process a control stream, download and update algorithms and/or models, wherein the control stream comprises device control commands and status reporting commands.

7. The front-end device of claim 6, wherein the front-end device further comprises a spatial-temporal determination module configured to acquire unified temporal information of the front-end device, maintain time synchronization between the front-end devices, determine position, velocity, and attitude information of the front-end device, provide the spatial-temporal information to other modules of the front-end device for computation and transmission, and receive a control command sent by the device control and data interaction module to complete the configuration of its own operating parameters.

8. The front-end device of claim 6, wherein the front-end device further comprises an image acquisition module configured to acquire and convert the image data, and transmit the image data to the image processing module.

9. An edge service for a visual computing system, wherein the edge service establishes communication connection with a front-end device and a cloud service of the visual computing system, respectively, for convergence, storage, and forwarding of video data and feature data at a local scale, and for resource scheduling and collaborative computing, the edge service comprising:
an integrated control module configured to receive reported data or commands from the front-end device, control their response process, push a compact feature stream and a structured result stream to the cloud service, receive and forward the control commands or model stream issued by the cloud service, manage an access process and status of the front-end device, listen to the status of the front-end device, and schedule a collaborative operation mode between a plurality of front-end devices;

a streaming media module configured to receive the compressed video stream, and transcode, capture and package the compressed video stream;

a calculation processing module configured to complete the work comprising at least one of scheme generation of a multi-node linkage system, image data processing and analysis, multi-node data collaborative analysis, and joint optimization according to the defined functions and tasks; and a data storage module configured to receive the compressed video stream of the streaming media module, and the compact feature stream and the structured result stream reported by the front-end device, store and manage the compressed video stream, the compact feature stream and the structured result stream in categories, receive a video/picture data fetching command issued by the cloud service, retrieve the compressed video stream or pictures according to conditions, and return the compressed video stream or pictures retrieved to the cloud service.

10. The edge service of claim 9, wherein the data storage module comprises an access management sub-module configured to support data entry, saving, and fetching operations.

11. The edge service of claim 9, wherein the data storage module comprises a data retrieval sub-module configured to perform data query and retrieval operations.

12. The edge service of claim 9, wherein the data storage module comprises a database sub-module configured to store structured data or unstructured data, the database sub-module comprising:

a video file library configured to store video stream data and summary information thereof;

a picture file library configured to store picture file data and summary information thereof;

a feature file library configured to store unstructured feature stream data and summary information thereof;

a structured feature library configured to store structured feature data; and a structured result library configured to store structured result data.

13. A cloud service for a visual computing system, wherein the cloud service establishes communication connection with an edge service of the visual computing system, for data converging, collaborative computing, analysis, mining, and decision-making at a global scale, the cloud service comprising:

a central control module configured to perform configuration management and resource scheduling on all nodes in the system, manage transmission processes of a data stream and a control stream in a unified manner, issue device control, function definition and model update commands to the front-end device, issue a task to the edge service, and receive and process a data reporting command and a status reporting command of the edge service;

a data center module configured to fetch a compressed video stream or pictures from the edge service on demand, to store, retrieve, and fetch a compact feature stream, a structured result stream, and the compressed video stream or pictures obtained on demand;

a data analysis module configured to receive the compact feature stream and the structured result stream, or retrieve and fetch data from the data center module according to user commands, converge big data information, analyze and mine the big data information, and extract high-level semantic information and return to a user;

a calculation simulation module configured to perform structured analysis and processing, simulation prediction, model training, model joint optimization, and collaborative strategy generation, and output computation results;

an algorithm model repository configured for storage, query and issuance processes and life cycle management of the algorithm model; and a user interaction module configured to receive a user-related command and return a processing result.

14. The cloud service of claim 13, wherein the data stream comprises multimedia data, feature data, result information, spatial-temporal information, environment data, device data, and an algorithm model.

15. The cloud service of claim 13, wherein the control stream refers to command data related to the operation of the system, the command data comprises a device registration command, a login command, a logout command, a device control command, a function definition command, a parameter configuration command, and a data query/fetching command.

16. The cloud service of claim 13, wherein the central control module comprises:

a configuration management sub-module configured to perform security authentication, configuration management, and status monitoring on all nodes of the front-end device, the edge service, and the cloud service;

a collaborative scheduling sub-module configured to issue the device control command, the function definition command, and the operating parameter command to the front-end device according to a scheduling strategy; and a command processing sub-module configured for receiving, parsing, and processing a reporting command and a query command of the edge service, issuing model stream data, and responding to the user interaction module.

17. The cloud service of claim 13, wherein the data analysis module comprises:

a data retrieval sub-module configured to receive or initiate data retrieval and fetching commands to the data center module to acquire data required for an analysis task;

a statistical analysis sub-module configured to perform multi-dimensional analysis on converged feature and result data using method comprising at least one of classification, regression, or correlation analysis; and a data mining sub-module configured to automatically extract hidden useful information and knowledge from a large amount of historical data or real-time data using method comprising at least one of artificial intelligence, machine learning, or statistics.

18. A visual computing method, comprising:

outputting, by a front-end device, compressed video data and feature data;

storing the video data, converging the feature data to a cloud service, and transmitting various types of data and control commands, by an edge service; and storing algorithm models used to support various applications, and issuing a model stream, by the cloud service, realizing a data transmission architecture with multiple streams of video stream, feature stream, and model stream in parallel, and a system architecture of end, edge, and cloud collaboration.

* * * * *